United States Patent [19]

Bryant

[11] 4,126,365
[45] Nov. 21, 1978

[54] COUNTER TOP TO BACK-SPLASH ELEMENT ATTACHMENT

[76] Inventor: Eugene E. Bryant, 1028 Josephine Crescent, Virginia Beach, Va. 23462

[21] Appl. No.: 903,190

[22] Filed: May 5, 1978

[51] Int. Cl.² .......................... A47B 96/18; A47F 9/00
[52] U.S. Cl. .................................. 312/140.4; 52/783; 108/27; 403/401; 52/822
[58] Field of Search ............... 312/140.1, 140.2, 140.3, 312/140.4, 137; 108/27; 52/623; 403/231, 401

[56] References Cited

U.S. PATENT DOCUMENTS

| | | | |
|---|---|---|---|
| 1,651,325 | 11/1927 | Bush | 403/401 |
| 2,981,580 | 4/1961 | Hansen | 108/27 |
| 3,606,508 | 9/1971 | Burnes | 312/140.3 |

Primary Examiner—Mervin Stein
Assistant Examiner—Alex Grosz
Attorney, Agent, or Firm—J. Maxwell Carson, Jr.

[57] ABSTRACT

A somewhat channel shaped elongated connector element interconnecting an upwardly extending backsplash element with a counter top along the rear edge thereof includes a lower flange abutting the lower surface of such counter top, a web section having a lower portion thereof abutting the rear edge of such counter top, and an upper flange positioned in a groove provided in the rear surface of such backsplash element. The connector element upper flange is not as thick as the groove in which it is positioned except at spaced intervals along the length thereof where protrusions are provided thereon; the thickness of such connector element upper flange added to the depth of such protrusions being greater than the width of such backsplash element groove. The "press-fit" of such protrusion carrying connector element upper flange within such groove strongly connects such backsplash element with such connector element.

7 Claims, 4 Drawing Figures

COUNTER TOP TO BACK-SPLASH ELEMENT ATTACHMENT

The present invention relates generally to a counter top backsplash attachment, and more particularly to an elongated element interconnecting the rear edge of a counter top and a backsplash element extending upwardly therefrom.

Counter tops installed in kitchens and the like generally have an elongated rear edge positioned substantially adjacent a room wall, and such counter tops usually form the upper wall or top of base structures such as cabinets or the like having a rear wall or the like somewhat spaced from the adjacent room wall to clear baseboard structures, pipes, wiring, and the like. An upwardly extending backsplash element is often installed along the rear edge of such a counter top in substantial abutment with the adjacent room wall, which serves to prevent water or other substances that may accumulate on such a counter top from passing down between the rear edge of the same and the adjacent room wall.

Heretofore, various types of backsplashes for counter tops have been devised, such as those shown in U.S. Pat. No. 2,785,937 granted on Mar. 19, 1957, to H. B. Murray (312/140.4 XR) and in U.S. Pat. No. 3,752,548 issued Aug. 14, 1973, to P. J. Betts (312/140.4), and it has further been proposed to construct a counter top and a backsplash with a continuous water impervious surface, as disclosed in U.S. Pat. No. 3,606,508 granted on Sept. 20, 1971, to H. E. Burnes (312/140.3). While it appears that such prior art installations are adequately functionable for the attainment of the contemplated objectives thereof, it is nevertheless considered that a more satisfactory solution of the problem of providing a counter top with a backsplash element is desirable, and consequently the present application is drawn to a simplified, inexpensive, and readily installed backsplash element attachment for such a counter top.

Accordingly, an object of the present invention is the provision of inexpensive and simplified means for readily effecting the interconnection of a backsplash element with a counter top rear edge.

Another object of the instant invention is the provision of an elongated element positionable along the entire rear edge of a counter top with which a backsplash element may be readily connected and thereby interconnected with such counter top.

According to the present invention, the foregoing and other objects are obtained by providing an elongated connector element having a somewhat modified channel section which operationally extends along substantially the entire length of the rear edge of a counter top and with which a backsplash element may thereafter be readily connected. More particularly, the elongated connector element, which is formed of relatively thin material, includes a relatively wide lower flange, a web section substantially perpendicularly disposed with respect to such lower flange thereof which in height exceeds the thickness of a counter top with which such connector element is useable, and an upper flange substantially perpendicularly disposed with respect to such web section thereof which is not as wide as the lower flange thereof; such upper flange centrally having operationally downwardly directed indentations formed therein at spaced intervals along the length thereof. Each of such connector element upper flange indentations has a somewhat dome-shaped lower surface operationally protruding downwardly from the lower surface of such connector element upper flange; the lowermost extent of which is situated at a predetermined distance from the upper surface of such connector element upper flange.

The connector element is positioned at the rear edge of a counter top with the connector element lower flange positioned beneath the counter top in contact with the lower surface thereof and the web section of such connector element simultaneously abutting the rear edge of such counter top. An elongated backsplash element, which in length may be equal to the length of such counter top, is provided with a groove operationally horizontally extending into the rear surface thereof; the upper side of such groove being substantially the same height above the lower edge of such backsplash element as the height of the upper surface of such connector element upper flange above such counter top when such connector element is positioned with respect thereto as hereinbefore set forth. The width of such groove formed in such backsplash element is not as great as the distance between the upper surface of such connector element upper flange and the lowermost extent of the lower surfaces of the indentations provided in such connector element upper flange. The backsplash element is moved against such connector element, positioned with respect to such counter top as hereinbefore described, and the upper flange of the connector elment enters such backsplash element groove; a "press-fit" connection between such connector element and such backsplash element thereby being achieved. It will now be apparent that the connector element, in effect, clamps such counter top and such backsplash element together. The line of juncture between the counter top and the front surface of the backsplash element may thereafter be suitably caulked.

A more complete appreciation of the invention and many of the attendant advantages thereof will be readily apparent as the same becomes better understood by reference to the following detailed description when considered in connection with the accompanying drawing wherein.

Figure 1:
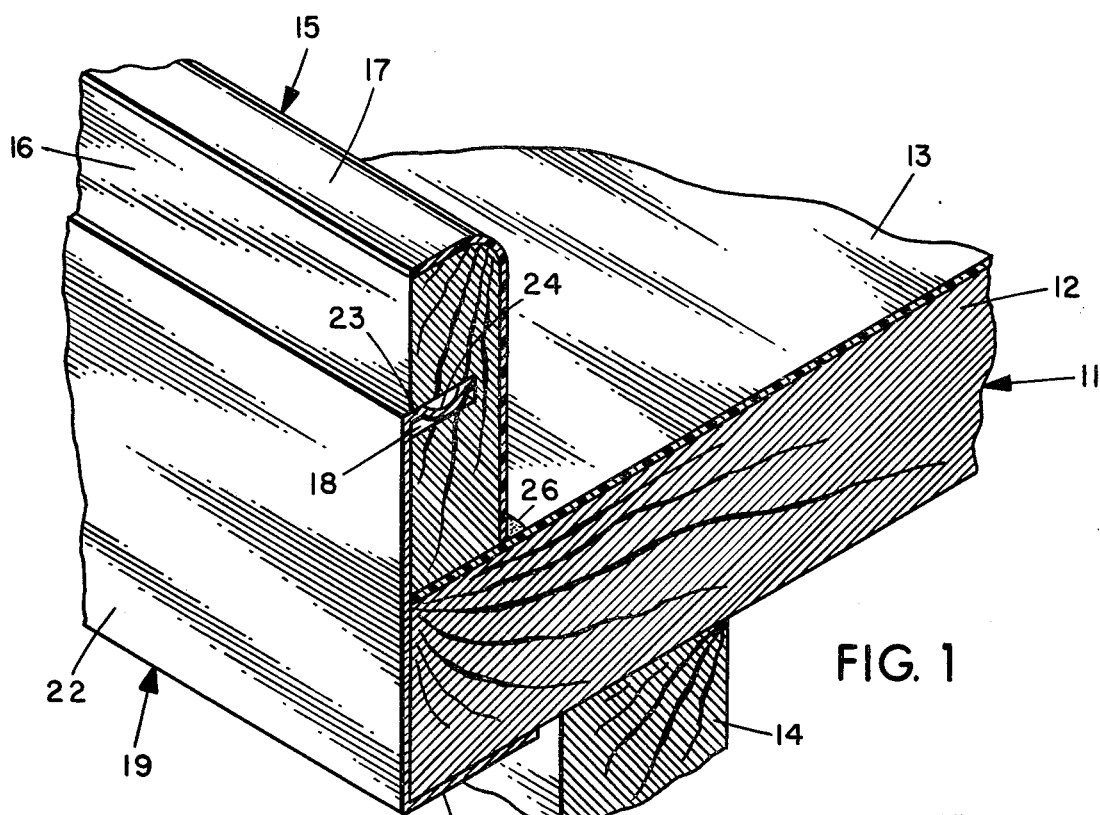
FIG. 1 is a sectional, fragmentary, perspective view of a counter top rear edge and a backsplash element with an elongated connector element interconnecting the same.

Referring now more particularly to the drawing, wherein like reference numerals designate the same or identical parts throughout the several views, and more specifically to FIG. 1, there is fragmentarily shown a counter top, generally designated by the reference numeral 11, and the rear edge thereof; counter top 11 including a fairly thick panel 12 of a material such as plywood, and which may include a relatively thin sheet 13 of water impervious material such as plastic suitably secured to the planar upper surface of the panel 12. The rear surface of the rear wall 14 of a base structure, such as a cabinet or cabinets, of which counter top 11 forms the upper wall or top, is spaced forwardly of the rear edge of the counter top 11 a distance sufficient to provide clearance for room wall baseboard structures, pipes, wiring, and the like, when the rear edge of the counter top 11 is positioned substantially adjacent a room wall. The length of the counter top 11, as well as the base structure including the wall 14, may be such as to extend substantially entirely along a room wall.

A backsplash element, generally designated by the reference numeral 15, which preferably is of the same length as the counter top 11, is positionable upon the counter top 11 to extend along the rear edge thereof. Backsplash element 15 includes a body section 16 formed of a length of material such as a wooden board having a flat lower edge and a height of at least several times the width thereof. The backsplash element 15 may include a relatively thin sheet 17 of water impervious material such as a plastic suitably secured to the front and upper surfaces of the body section 16 thereof. The body section 16 of backsplash element 15 is provided with a groove 18 operationally substantially horizontally extending into the rear surface thereof along the entire length thereof to a depth of up to about two-thirds of the width of such body section 16 of backsplash element 15.

An elongated connector element, generally designated by the reference numeral 19, is provided for interconnecting the rear edge of counter top 11 and the backsplash element 15. The connector element 19, which may be formed of metallic sheet material bent into the hereinafter described configuration, or of extruded metallic material, may be provided in lengths of up to about ten feet, which thereafter may be cut by means of a hacksaw or the like to the length appropriate for a particular counter top and backsplash element installation. Of course, if a particular counter top and backsplash element installation is longer than a full length of connector element 19, a full length of connector element 19 and at least a portion of another full length thereof, arranged in abutting end-to-end relation, may be employed therewith.

The connector element 19 is a somewhat modified channel section including a lower flange 21 having a width somewhat smaller than the distance between the rear edge of counter top 11 and the rear surface of the rear wall 14 of the base structure of which counter top 11 forms the upper wall or top. Connector element 19 further includes a web section 22 substantially perpendicularly disposed with respect to the lower flange 21 thereof, and also includes an upper flange 23 substantially perpendicularly disposed with respect to the web section 22 thereof; the upper flange 23 and the lower flange 21 of connector element 19 extending in the same direction from the web section 22 thereof.

The height of the web section 22 of connector element 19 is such that when the upper surface of the lower flange 21 thereof is at the level of the planar lower surface of the counter top 11 the upper surface of the upper flange 23 of connector element 19 is substantially at, or preferably slightly lower than, the level of the upper side of the groove 18 provided in the body section 16 of the backsplash element 15 when such backsplash element 15 is operationally positioned upon the counter top 11. The width of the connector element upper flange 23 is equal to or slightly less than the depth of the groove 18 provided in the body section 16 of backsplash element 15, and the width of the upper flange 23 of connector element 19 is less than the width of the lower flange 21 thereof.

The upper flange 23 of connector element 19 is centrally provided with operationally downwardly directed indentations 24 formed therein at spaced intervals along the length thereof; the upper surface of the connector element upper flange 23 being depressed at the location of each of such indentations 24. Each of such connector element upper flange indentations 24 has a somewhat dome-shaped lower surface operationally protruding downwardly from the lower surface of such connector element upper flange 23. The operationally lowermost extent of the lower surface of each of such indentations 24 is at a distance from the upper surface of the upper flange 23 of connector element 19 somewhat greater than the width of the groove 18 provided in the rear surface of the body section 16 of backsplash element 15.

In order to effect the interconnection of the counter top 11 and the backsplash element 15, the connector element 19 is positioned with the upper surface of the lower flange 21 thereof abutting the planar lower surface of the counter top 11 and a lower portion of the web section 22 of the connector element 19 simultaneously abutting the rear edge of the counter top 11. The connector element 19 is thereafter maintained in such position in any suitable manner pending connection of the backsplash element 15 therewith. The backsplash element 15, positioned with the flat lower edge of the body section 16 thereof in contact with the upper surface of counter top 11 and the groove 18 formed in the rear surface of the backsplash element body section 16 facing the upper flange 23 of the connector element 19, is moved towards the connector element 19. The upper flange 23 of connector element 19 is consequently forcibly fully received in the groove 18 provided in the body section 16 of backsplash element 15, and the lower extremities of the indentations 24 provided in the connector element upper flange 23 bear strongly against the lower side of the groove 18 provided in the body section 16 of backsplash element 15 and even may somewhat penetrate thereinto. The backsplash element 15 is thereby strongly attached to the connector element 19 by this "press-fit" connection. Moreover, the backsplash element 15 is thereby strongly clamped to the counter top 11 along the rear edge thereof by the connector element 19. The additional width of the connector element lower flange 21 is considered to be of material assistance in the establishment of such a clamping action by the connector element 19.

Figure 2:
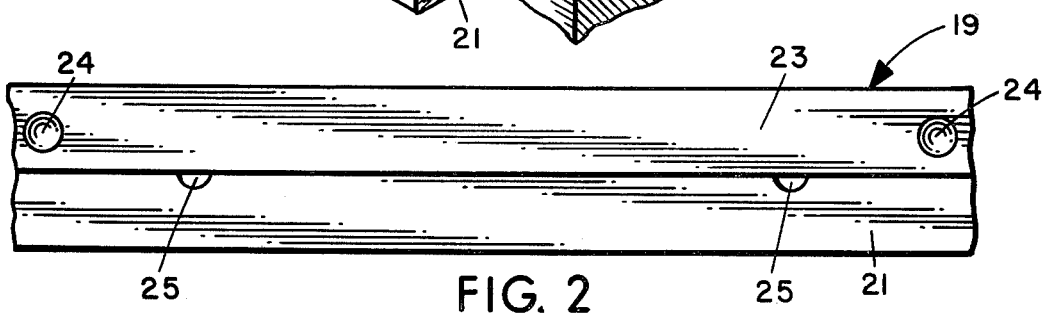
FIG. 2 is a fragmentary, top plan view of the connector element.
Figures 3, 4:
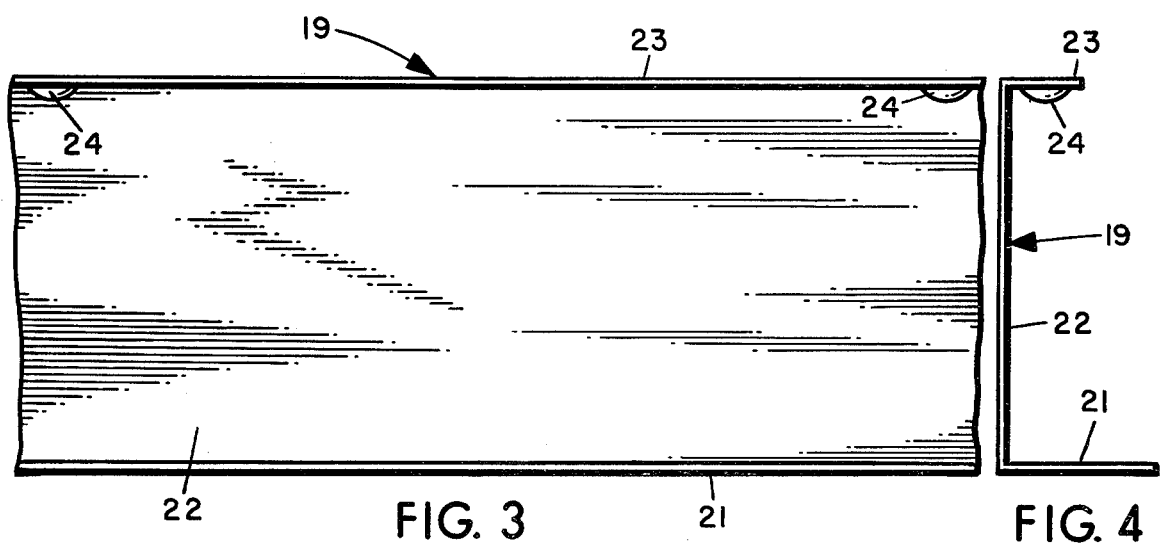
FIG. 3 is a fragmentary, front elevational view of the connector element.
FIG. 4 is an end elevational view of the connector element.

It may be deemed desirable to physically attach the connector element 19 to the counter top 11 in the hereinbefore described operational position prior to the connection of the backsplash element 15 therewith. Accordingly, a plurality of longitudinally spaced apertures 25 may be provided in the lower flange 21 of the connector element 19, as shown in FIG. 2, or alternatively in the lower portion of the web section 22 thereof operationally abutting the rear edge of counter top 11, through which wood screws, nails, or the like, may extend into the panel 12 of counter top 11 for securing the connector element 19 to the counter top 11 in the hereinbefore described operational position thereof.

When the backsplash element 15 has been operationally interconnected with the counter top 11 along the rear edge thereof, as hereinbefore set forth, caulking material 26 is preferably applied along the line of juncture between the counter top 11 and the front surface of the backsplash element 15 to seal the same and prevent the passage of water or other substances beneath the lower edge of the backsplash element 15.

Obviously, many modifications and variations of the present invention are possible in the light of the foregoing teachings. It is therefore to be understood within the scope of the appended claims the invention may be practiced otherwise than as specifically described.

What is claimed as new and desired to be secured by Letters Patent of the United States of America is:

1. A counter top to backsplash element attachment, comprising:

an elongated counter top;

an elongated upwardly extending backsplash element having a groove operationally extending substantially horizontally into the rear surface thereof, said backsplash element positioned upon said counter top along the rear edge thereof; and an elongated connector element having substantially a channel shaped cross section interconnecting said counter top and said backsplash element, said connector element having a lower flange, the upper surface of said connector element lower flange abutting the lower surface of said counter top, said connector element having a web section, a lower portion of said connector element web section abutting the rear edge of said counter top, said connector element having an upper flange extending into said groove provided in said rear surface of said backsplash element, said connector element upper flange being provided with at least one protrusion, the combined depth of said connector element upper flange protrusion and the thickness of said connector element upper flange being greater than the width of said groove provided in said rear surface of said backsplash element for thereby achieving and maintaining a press-fit connection between said connector element upper flange and said backsplash element.

2. The counter top backsplash element attachment according to claim 1, wherein said lower flange of said connector element is wider that said upper flange thereof.

3. The counter top backsplash attachment according to claim 2, wherein said connector element is provided with longitudinally spaced apertures through which fasteners may extend into said counter top for securing said connector element to said counter top.

4. The counter top backsplash element attachment according to claim 1, wherein a plurality of protrusions are provided on said connector element upper flange at spaced intervals along the length thereof, each of said protrusions being formed by an indentation provided in said connector element upper flange whereby one surface of said connector element upper flange is depressed at the location of said indentation and the other surface of said connector element upper flange at the location of said indentation is somewhat dome-shaped and protrudes outwardly from the surrounding surface of said connector element upper flange.

5. The counter top backsplash attachment according to claim 4, wherein each of said protrusions are operationally downwardly directed.

6. The counter top backsplash element attachment according to claim 5, wherein said lower flange of said connector element is wider than said upper flange thereof.

7. The counter top backsplash element attachment according to claim 6, wherein said connector element is provided with longitudinally spaced apertures through which fasteners may extend into said counter top for securing said connector element to said counter top.

* * * * *